(12) United States Patent
Werner

(10) Patent No.: US 9,341,140 B2
(45) Date of Patent: May 17, 2016

(54) VARIABLE AREA MECHANISM WITH ANGULAR TRAILING EDGES

(75) Inventor: Eric Lee Werner, Saint Charles, MO (US)

(73) Assignee: The Boeing Company, Chicago, IL (US)

(*) Notice: Subject to any disclaimer, the term of this patent is extended or adjusted under 35 U.S.C. 154(b) by 810 days.

(21) Appl. No.: 13/370,206

(22) Filed: Feb. 9, 2012

(65) Prior Publication Data

US 2013/0206858 A1    Aug. 15, 2013

(51) Int. Cl.
*F02K 1/12*    (2006.01)

(52) U.S. Cl.
CPC ........................... *F02K 1/12* (2013.01)

(58) Field of Classification Search
CPC ............... B05B 1/30; B05B 1/32; F02K 1/06; F02K 1/08; F02K 1/085; F02K 1/09; F02K 1/10; F02K 1/11; F02K 1/12

USPC ..................................................... 239/11, 546
See application file for complete search history.

(56) References Cited

U.S. PATENT DOCUMENTS

| 2,625,008 | A  | * | 1/1953  | Crook ....................... 239/127.3 |
| 5,044,553 | A  | * | 9/1991  | Degress .................. F02K 1/006 239/11 |
| 5,141,154 | A  |   | 8/1992  | Barcza |
| 5,294,055 | A  |   | 3/1994  | Garrett et al. |
| 6,910,328 | B1 |   | 6/2005  | Joyce |
| 2008/0069687 | A1 | | 3/2008  | Lace |
| 2010/0327078 | A1 | | 12/2010 | Baker et al. |

\* cited by examiner

*Primary Examiner* — Christopher Kim
(74) *Attorney, Agent, or Firm* — McDonnell Boehnen Hulbert & Berghoff LLP

(57) ABSTRACT

A variable area mechanism and methods are disclosed. A movable surface comprising a contoured interface surface is operable to rotate about an off-body axis-of-rotation such that the movable surface expands from and retracts into an angle notched surface.

7 Claims, 14 Drawing Sheets

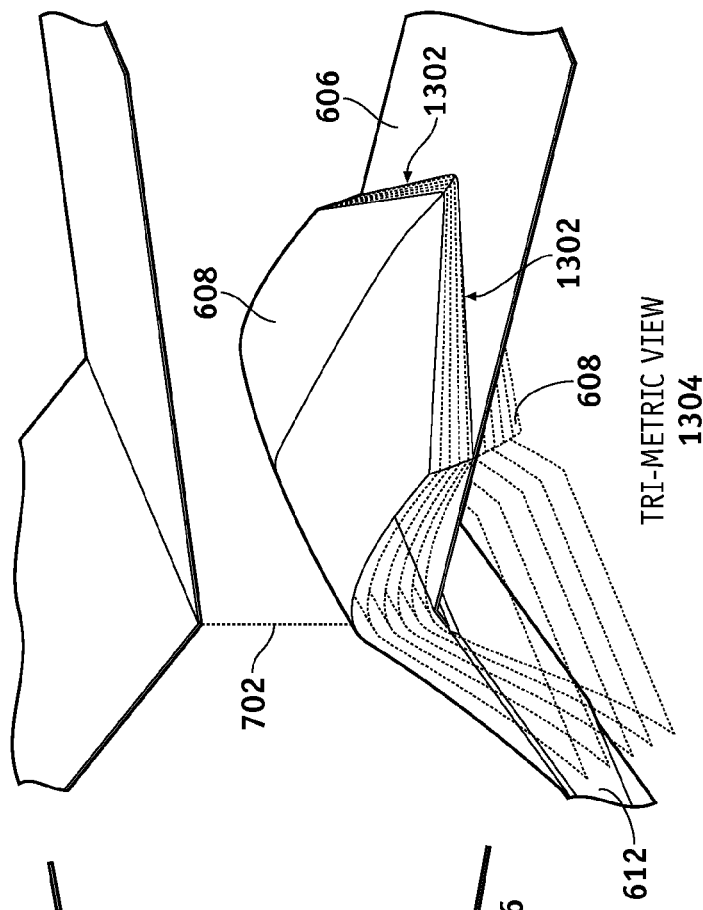
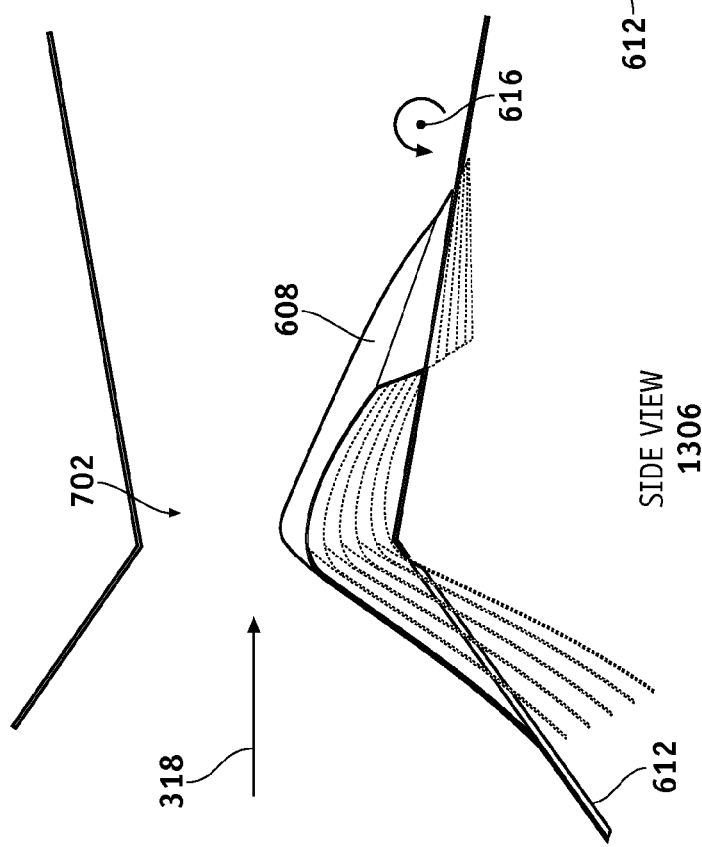
FIG. 13

VARIABLE AREA MECHANISM WITH ANGULAR TRAILING EDGES

FIELD

Embodiments of the present disclosure relate generally to fluid-dynamic design. More particularly, embodiments of the present disclosure relate to design of fluid-dynamic control surfaces.

BACKGROUND

Supersonic vehicles that utilize engines with afterburners to augment thrust generally require a mechanism to change flow area in a throat section of a nozzle of the engine. Current throat area control systems in 2D convergent-divergent nozzles typically rely on translation of a mechanism or rotation of a mechanism around an axis perpendicular to a flow through the flow area. As a result, edges or hinge lines perpendicular to the exhaust airflow and planform of the vehicle are introduced. Edges or hinge lines are undesirable features for survivability in advanced aircraft designs. Furthermore, orienting the edges of the current mechanisms to be angular to the airflow results in gaps requiring very complicated sealing techniques, making them infeasible for use.

SUMMARY

A variable area mechanism and methods are disclosed. A movable flow area control surface comprising a specially contoured interface surface is operable to rotate about an off-body axis-of-rotation such that the movable flow area control surface expands from and retracts into an angle notched nozzle surface without opening asymmetric gaps due to the specially contoured interface surface.

Supersonic vehicles that utilize engines with afterburners to augment thrust require a mechanism to change flow area in a throat section of a nozzle. The variable area mechanism with angular trailing edges described herein does so in a manner that is simple, requires a minimal amount of sealing at interfaces from hot exhaust gases, and maintains angular trailing edges for improved survivability.

In an embodiment, a variable area mechanism comprises a movable surface comprising a contoured interface surface. The movable surface is operable to rotate about an off-body axis-of-rotation such that the movable surface expands from and retracts into an angle notched surface.

In another embodiment, a method for varying a cross-sectional area of an enclosed volume rotates a movable flow area control surface comprising a contoured interface surface about an off-body axis-of-rotation such that the movable flow area control surface expands from and retracts into an angle notched surface.

In a further embodiment, a method for providing a variable area mechanism provides a movable flow area control surface comprising a contoured interface surface. The method further couples the movable flow area control surface to an off-body-axis rotation-system operable to rotate the movable surface around the off-body axis-of-rotation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 13 is an illustration of a side view, and a tri-metric view of an exemplary nozzle throat area utilizing a nozzle throat control system with angular trailing edges showing various positions of the nozzle throat control system during rotation around an off-body axis-of-rotation without opening any gap according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, nozzle design, vehicle structures, fluid dynamics, flight control systems, engines, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an aircraft engine nozzle. Embodiments of the disclosure, however, are not limited to such aircraft engine nozzle applications, and the techniques described herein may also be utilized in other applications. For example but without limitation, embodiments may be applicable to tubes, pipes, automobile engines, or other fluid dynamic surface and/or enclosed volume.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
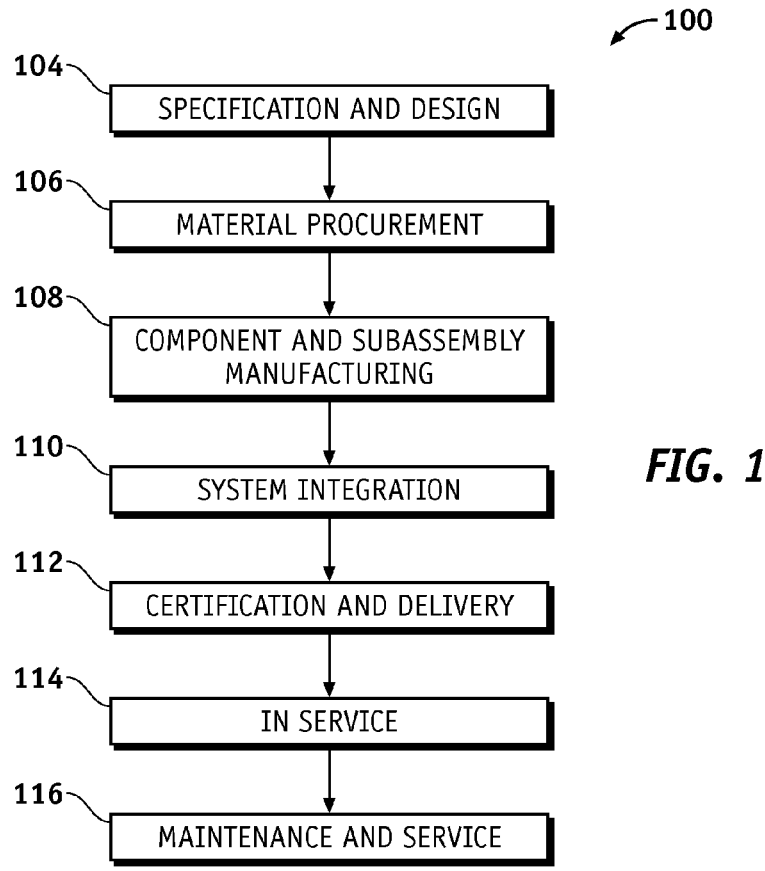
FIG. 1 is an illustration of a flow diagram of an exemplary aircraft production and service methodology.
Figure 2:
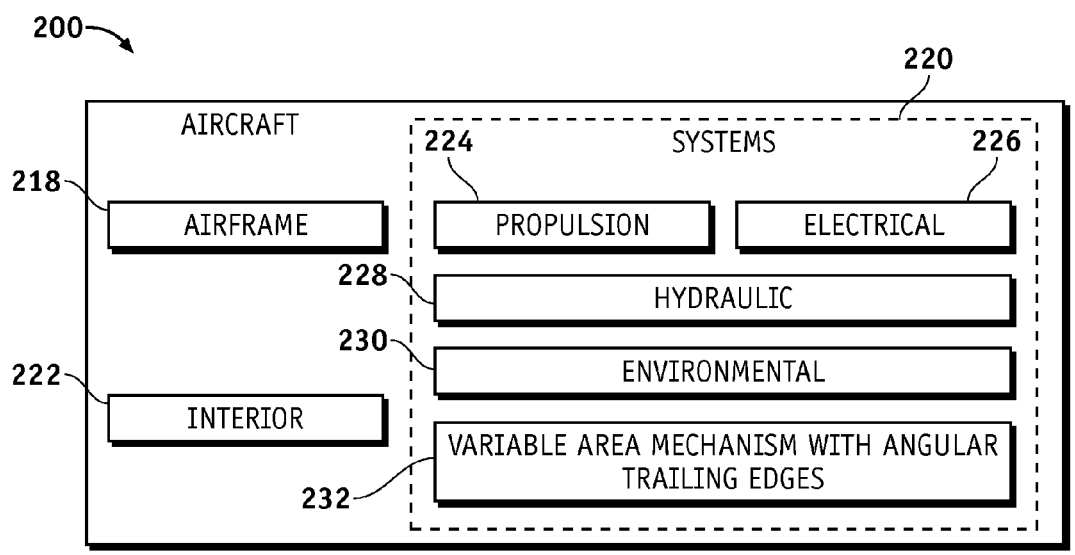
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a variable area mechanism with angular trailing edges 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Supersonic vehicles that utilize engines with afterburners to augment thrust require a mechanism to change flow area in the throat section of the nozzle. The variable area mechanism with angular trailing edges described herein does so in a manner that is simple, requires a minimal amount of sealing at interfaces from the hot exhaust gases, and most importantly maintains angular trailing edges for improved survivability.

Existing solutions generally utilize ramp systems that may be extremely difficult or impossible to implement when hinges, gaps and interfaces need to be oriented at an angle relative to a flow direction.

When an axis of rotation is perpendicular to edges of a mechanism and flow direction, the mechanism should rotate to change area without opening asymmetric gaps, as gaps need to be sealed in a nozzle from a hot gas environment. If the edges of the mechanism need to be angled relative to the flow for design considerations, simple rotation along a perpendicular axis may cause asymmetric gaps opening as the mechanism is rotated. These gaps are very undesirable, and may make this type of mechanism not feasible for use.

In contrast, embodiments of the discloser utilize a rotation around an axis above and aft of a trailing edge of the mechanism, coupled with an appropriately contoured interface surface, to expand from and retract into a floor of the nozzle to change a throat area while maintaining angular trailing edges at an angle to the flow direction without opening the gaps.

Figure 3:
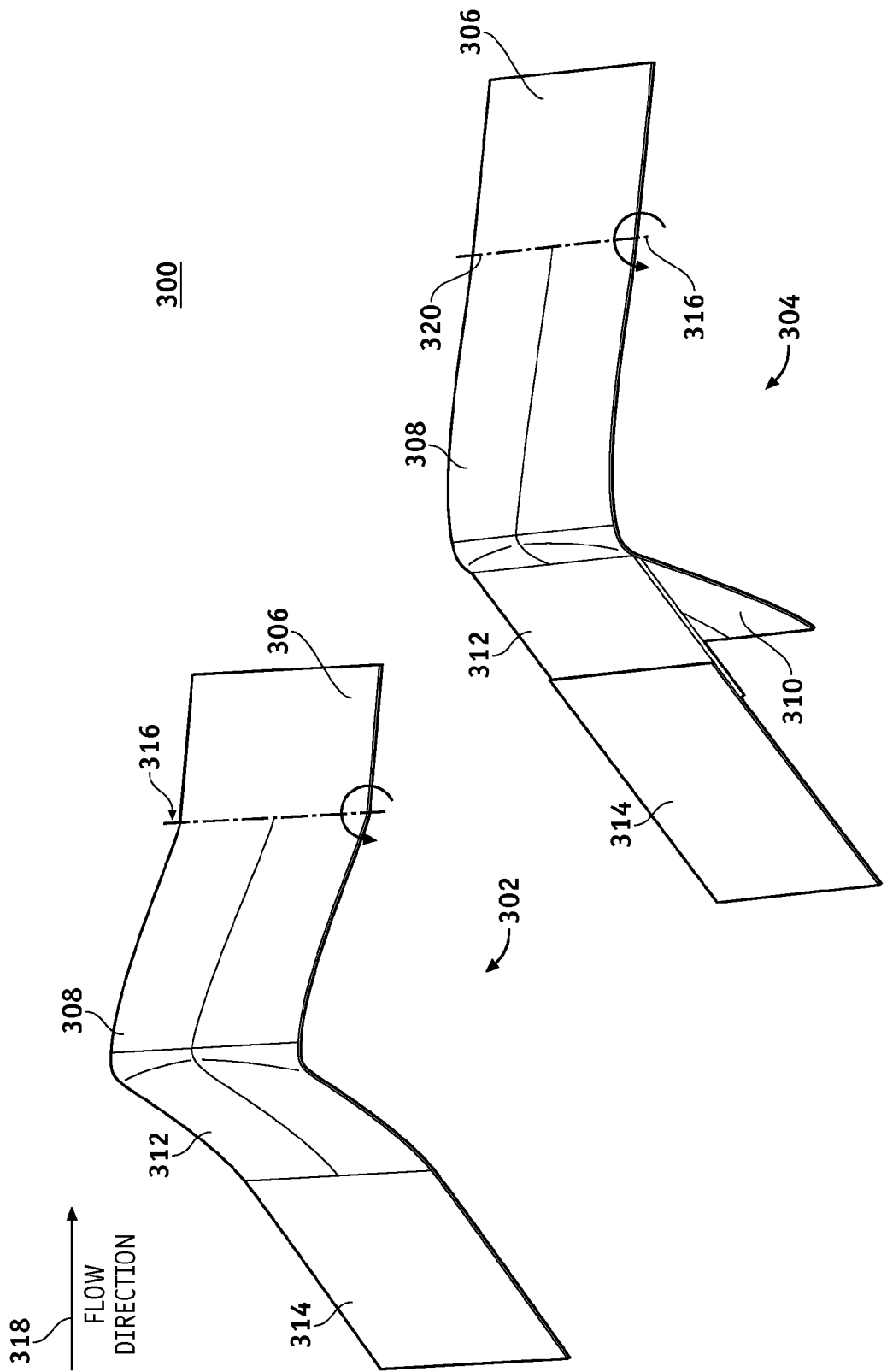
FIG. 3 is an illustration of a typical current nozzle throat control system showing side views thereof at a minimum throat area position and at a maximum throat area position, the nozzle throat control system is translated or rotated around an axis perpendicular relative to edges thereof and relative to a flow direction, movement occurs without opening any gap at a trailing edge.

FIG. 3 is an illustration of a typical current nozzle throat control system 300 (system 300) showing side views thereof at a minimum throat area position 302 and at a maximum throat area position 304. When the nozzle throat control system is translated or rotated around an axis of rotation 316 perpendicular relative to edges thereof and relative to a flow direction 318, movement occurs without opening a gap at a trailing edge 320. The nozzle throat control system 300 comprises a nozzle surface 306, a movable surface 308, a forward angle side 310, a slide interface 312, and a forward flow panel 314. Current throat area control systems such as the system 300 rely on translation or rotation around the axis of rotation 316 perpendicular to the flow direction 318. When the edges of the system 300 are perpendicular to the axis of rotation 316, the system 300 can rotate to change area without opening asymmetric gaps. Gaps need to be sealed in a nozzle from a hot gas environment. Sealing gaps in the nozzle may be very complicated.

Figure 4:
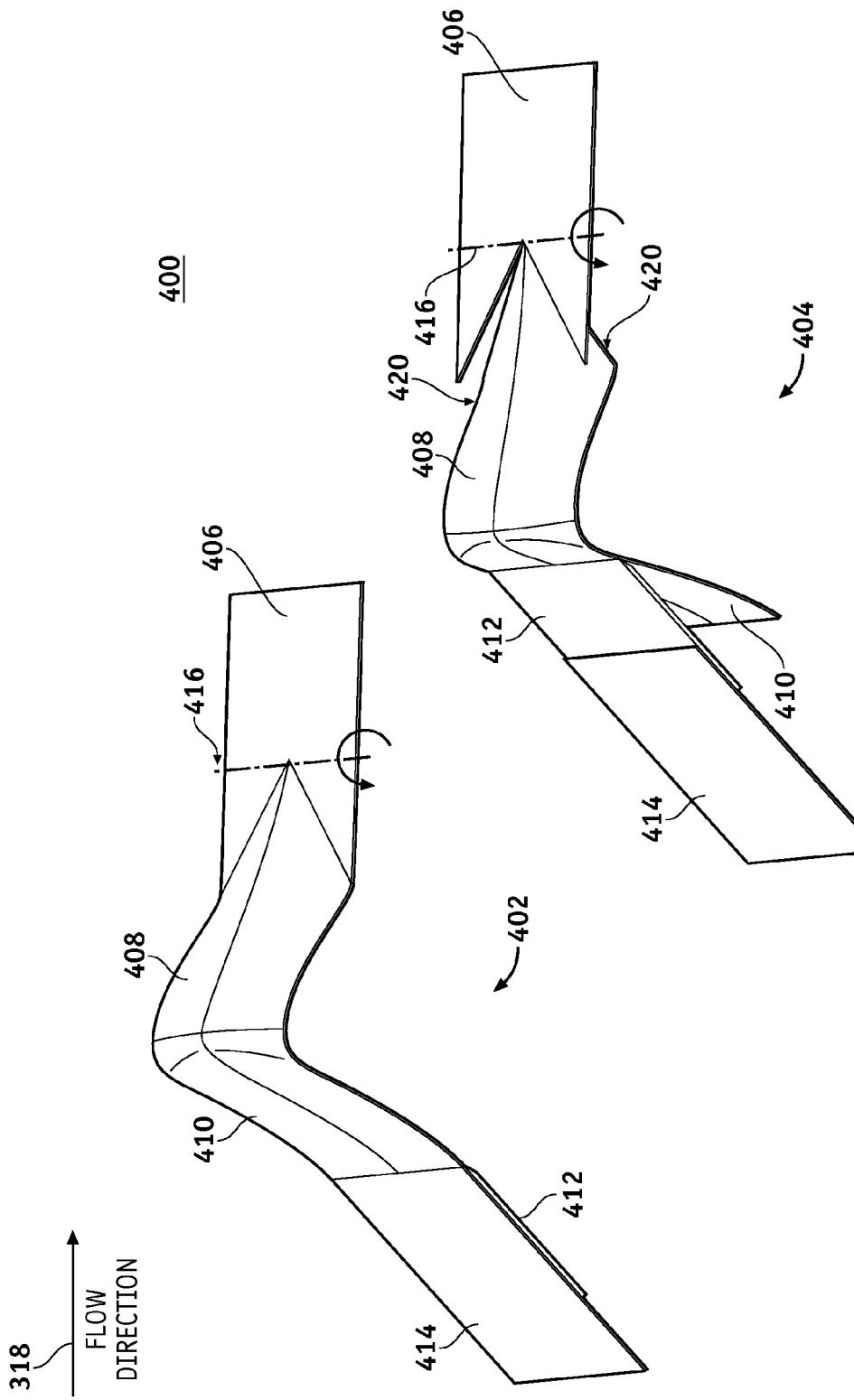
FIG. 4 is an illustration of a nozzle throat control system showing side views thereof at a minimum throat area position and at a maximum throat area position when the nozzle throat control system is translated or rotated around an axis at an angle relative to edges thereof and perpendicular relative to a flow direction, thereby opening asymmetric gaps.

FIG. 4 is an illustration of a nozzle throat control system 400 (system 400) showing side views thereof at a minimum throat area position 402 and at a maximum throat area position 404 when the nozzle throat control system 400 is translated or rotated around a rotation axis 416 relative to edges of the system 400 and perpendicular relative to the flow direction 318, thereby opening asymmetric gaps 420. The gaps may be difficult or impossible to seal, and therefore this configuration may be infeasible. The nozzle throat control system 400 comprises a notched nozzle surface 406, a movable surface 408, a forward angle side 410, a slide interface 412, and a forward flow panel 414.

If the edges of the system 400 need to be angled relative to the flow direction 318 for design considerations, simple rotation around the rotation axis 416 perpendicular to the flow direction 318 can open asymmetric gaps 420. Gaps need to be sealed in a nozzle from a hot gas environment. The gaps may be difficult or impossible to seal, and therefore this configuration may be infeasible. Thereby, the system 400 may not be feasible for use.

Figure 5:
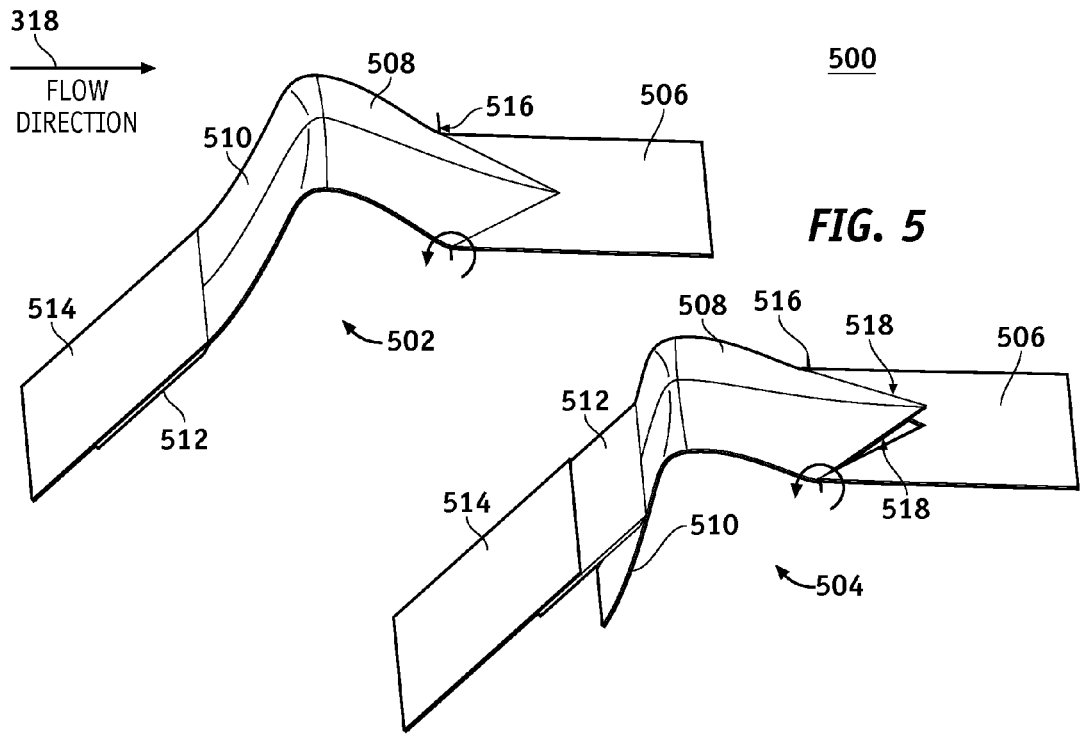
FIG. 5 is an illustration of a nozzle throat control system showing side views thereof at a minimum throat area position and at a maximum throat area position when the nozzle throat control system is translated or rotated around a different axis, than the axis in FIG. 4, at an angle relative to edges thereof and perpendicular relative to the flow direction also opening asymmetric gaps.

FIG. 5 is an illustration of a nozzle throat control system 500 (system 500) showing side views thereof at a minimum throat area position 502 and at a maximum throat area position 504 when the nozzle throat control system 500 is translated or rotated around a rotation axis 516 (e.g., that is different than the rotation axis 416 in FIG. 4) at an angle relative to the flow direction 318 also opening asymmetric gaps 518. The nozzle throat control system 500 comprises a notch nozzle surface 506, a movable surface 508, a forward angle side 510, a slide interface 512, and a forward flow panel 514.

Comparing FIGS. 4 and 5 shows that moving the rotation axis 416 to the rotation axis 516 does not solve the problem of opening gaps. Moving the rotation axis 416 just opens up asymmetric gaps such as the asymmetric gaps 518 in a different place. Gaps need to be sealed in a nozzle from a hot gas environment. The gaps would be difficult or impossible to seal, and therefore this design may be infeasible. Thereby, the system 500 may not be feasible for use.

Figure 6:
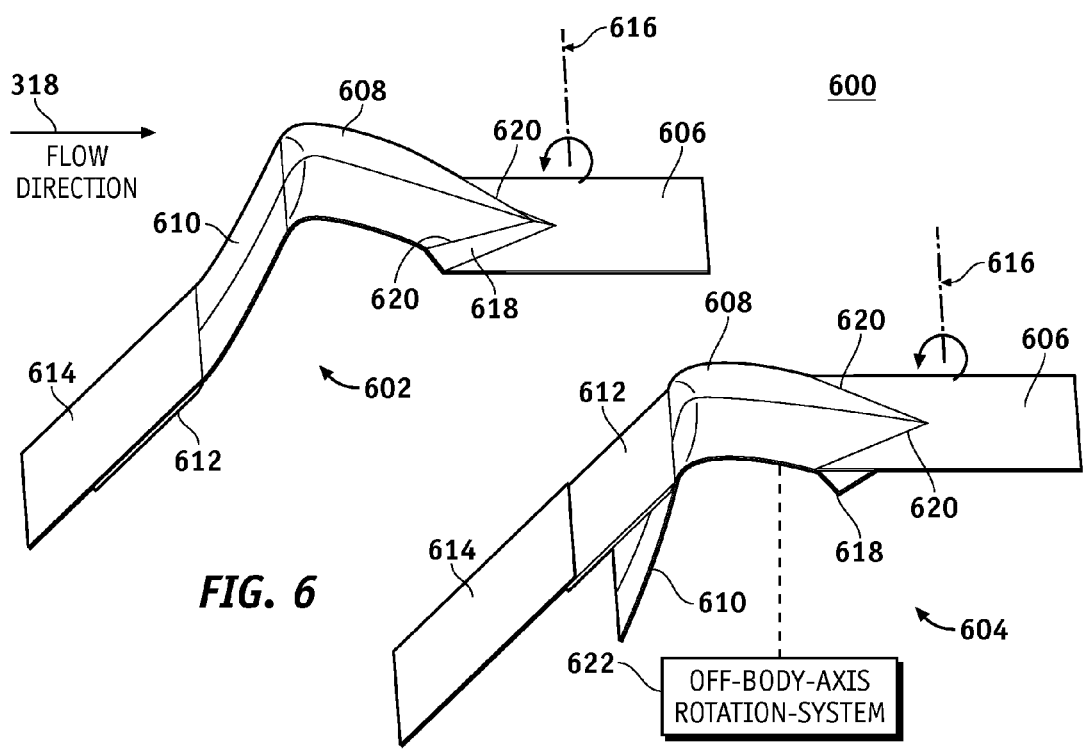
FIG. 6 is an illustration of an exemplary nozzle throat control system showing side views thereof at a minimum throat area position and at a maximum throat area position when the nozzle throat control system is rotated around an off-body axis-of-rotation at an angle relative to edges thereof and relative to a flow direction without opening asymmetric gaps according to an embodiment of the disclosure.

FIG. 6 is an illustration of an exemplary nozzle throat control system 600 (system 600) showing side views thereof at a minimum throat area position 602 and at a maximum throat area position 604 when the nozzle throat control system 600 is rotated around an off-body axis-of-rotation 616 at an angle relative to angular trailing edges 620 thereof and perpendicular relative to a flow direction 318 without opening asymmetric gaps according to an embodiment of the disclosure.

The nozzle throat control system 600 comprises an angle notched nozzle surface 606 (angle notched surface 606), a movable flow area control surface 608 (movable surface 608), a forward angle side 610, a slide interface 612, a forward flow panel 614, a contoured interface surface 618, and an off-body-axis rotation-system 622. The system 600 utilizes the off-body axis-of-rotation 616 and a specially contoured interface surface 618 that can have the angular trailing edges 620 and rotate through the motion without opening gaps.

The movable surface 608 comprises the contoured interface surface 618 and is configured to rotate about the off-body axis-of-rotation 616 such that the movable surface 608 expands from and retracts into the angle notched nozzle surface 606. In one embodiment, the movable surface 608 is configured to throttle a fluid flow. The movable surface 608 further comprises a forward angle side 610.

The forward flow panel 614 comprises the slide interface 612 configured to interface with the forward angle side 610 to seal the asymmetric gaps 420 and 518 shown in FIGS. 4 and 5 respectively.

The system 600 allows a very desirable design feature of the angular trailing edges 620 to be present without introducing complexity through asymmetric gaps 420 and 518 shown in FIGS. 4 and 5 respectively.

The off-body-axis rotation-system 622 is coupled to the movable surface 608 and is configured to rotate the movable surface 608 about the off-body axis-of-rotation 616.

Figure 7:
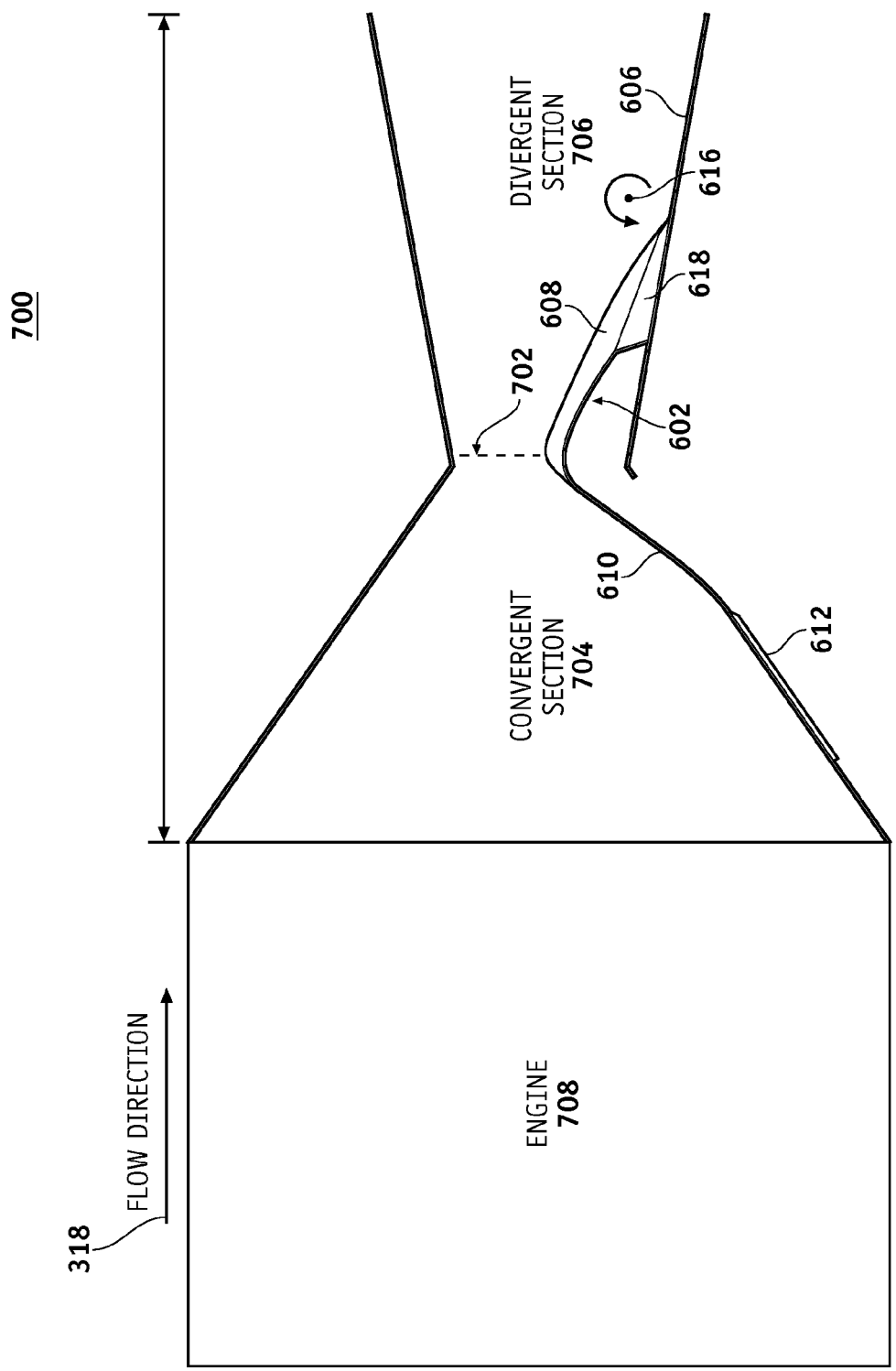
FIG. 7 is an illustration of a cross section of an exemplary convergent-divergent nozzle utilizing a nozzle throat control system according to an embodiment of the disclosure.

FIG. 7 is an illustration of a cross section of an exemplary convergent-divergent nozzle 700 (nozzle 700) utilizing a nozzle throat control system 600 at the minimum throat area position 602 (FIG. 6) according to an embodiment of the disclosure. The nozzle 700 comprises a convergent section 704 coupled to an engine 708, a throat area 702, and a divergent section 706. The nozzle throat control system 600 is located at the throat area 702 of the nozzle 700. The movable surface 608 rotates about the off-body axis-of-rotation 616 such that the throat area 702 of the nozzle 700 is changed.

The nozzle 700 is one example of an enclosing volume coupled to the nozzle throat control system 600. Other enclosing volumes can also be coupled to the nozzle throat control system 600. For example but without limitation, the enclosing volume may comprise a pipe, a pump, a hydraulic pump-jet, or other enclosing volume. In one embodiment, the enclosing volume comprises the angle notched nozzle surface 606.

Figure 8:
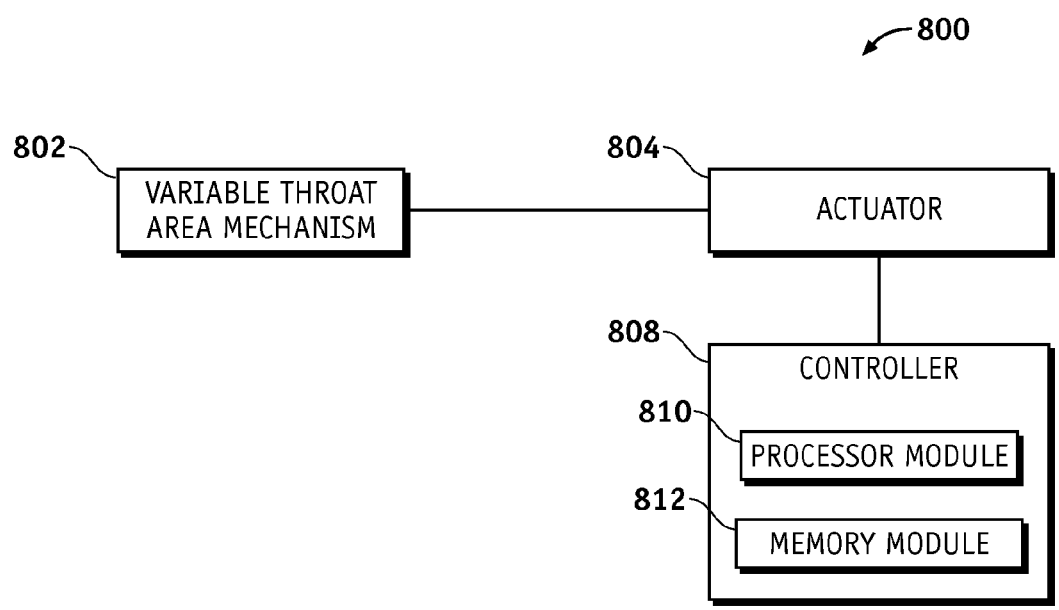
FIG. 8 is an illustration of an exemplary functional block diagram of a nozzle throat control system according to an embodiment of the disclosure.

FIG. 8 is an illustration of an exemplary functional block diagram of a nozzle throat control system 800 (system 800) according to an embodiment of the disclosure. The system 800 may comprise a variable throat area mechanism 802, an actuator 804, and a controller 808.

The actuator 804 is operable to vary a position (i.e., bend, deflect, change shape) of the movable surface 608 (FIG. 6) in response to an actuation command. In this manner, the movable surface 608 can change position to vary the throat area 702 of the nozzle 700. In one embodiment, the actuator 804 is controlled via a passive control mechanism to control the position of the movable surface 608 based on temperature corresponding to, for example, an altitude at a flight condition. In another embodiment, the controller 808 may include or be realized as a controller (connected to the aircraft systems), to facilitate controlling a position (i.e., changing the shape) of the movable surface 608.

Any actuator known to those skilled in the art may be used for actuation of the movable surface 608. For example but without limitation, a hydraulic actuator, a piezoelectric actuator, a spring loaded mechanism, a reverse flow blocking mechanism, a pyrotechnic actuator, a shape memory alloy actuator, or other actuator may be used.

The controller 808 may comprise, for example but without limitation, a processor module 810, a memory module 812, and other module. The controller 808 may be implemented as, for example but without limitation, a part of an aircraft system, a centralized aircraft processor, a subsystem computing module devoted to the variable throat area mechanism 802, or other implementation.

The controller 808 is configured to control the actuator 804 to vary a position of the movable surface 608 according to various operation conditions. The operation conditions may comprise, for example but without limitation, flight conditions, ground operations, or other condition. The flight conditions may comprise, for example but without limitation, take off, cruise, approach, landing, or other flight condition. The ground operations may comprise, for example but without limitation, air breaking after landing, or other ground operation. The controller 808, may be located remotely from the actuator 804, or may be coupled to the actuator 804.

The processor module 810 comprises processing logic that is configured to carry out the functions, techniques, and processing tasks associated with the operation of the system 800. In particular, the processing logic is configured to support the system 800 described herein. For example, the processor module 810 may direct the actuator 804 to vary a shape of the movable surface 608 based on various flight conditions.

The processor module 810 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 812 may comprise a data storage area with memory formatted to support the operation of the system 800. The memory module 812 is configured to store, maintain, and provide data as needed to support the functionality of the system 800. For example, the memory module 812 may store flight configuration data, control temperature data, actuator command signals, or other data.

In practical embodiments, the memory module 812 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 812 may be coupled to the processor module 810 and configured to store, for example but without limitation, a database, and the like. Additionally, the memory module 812 may represent a dynamically updating database containing a table for updating the database, and the like. The memory module 812 may also store, a computer program that is executed by the processor module 810, an operating system, an application program, tentative data used in executing a program, or other application.

The memory module 812 may be coupled to the processor module 810 such that the processor module 810 can read information from and write information to the memory module 812. For example, the processor module 810 may access the memory module 812 to access an aircraft speed, a flight control surface position, an angle of attack, a Mach number, an altitude, or other data.

As an example, the processor module 810 and memory module 812 may reside in respective application specific integrated circuits (ASICs). The memory module 812 may also be integrated into the processor module 810. In an embodiment, the memory module 812 may comprise a cache memory for storing temporary variables or other intermediate information during execution of instructions to be executed by the processor module 810.

Figure 9:
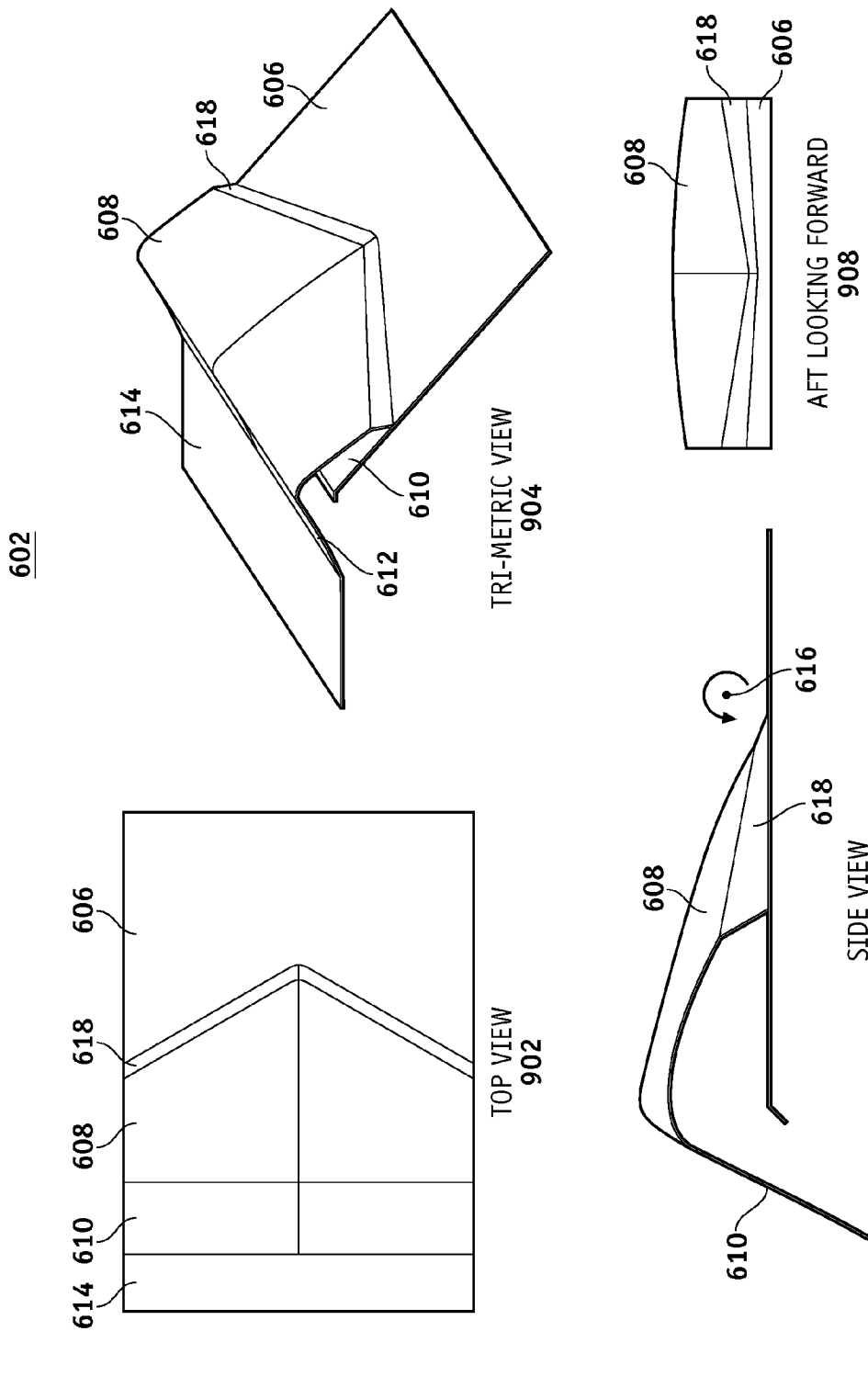
FIG. 9 is an illustration of a top view, a tri-metric view, a side view and an aft-looking-forward view of an exemplary nozzle throat control system at a minimum throat area position according to an embodiment of the disclosure.

FIG. 9 is an illustration of a top view 902, a tri-metric view 904, a side view 906 and an aft-looking-forward view 908 of the exemplary nozzle throat control system 600 at the minimum throat area position 602 (FIG. 6) according to an embodiment of the disclosure.

Figure 10:
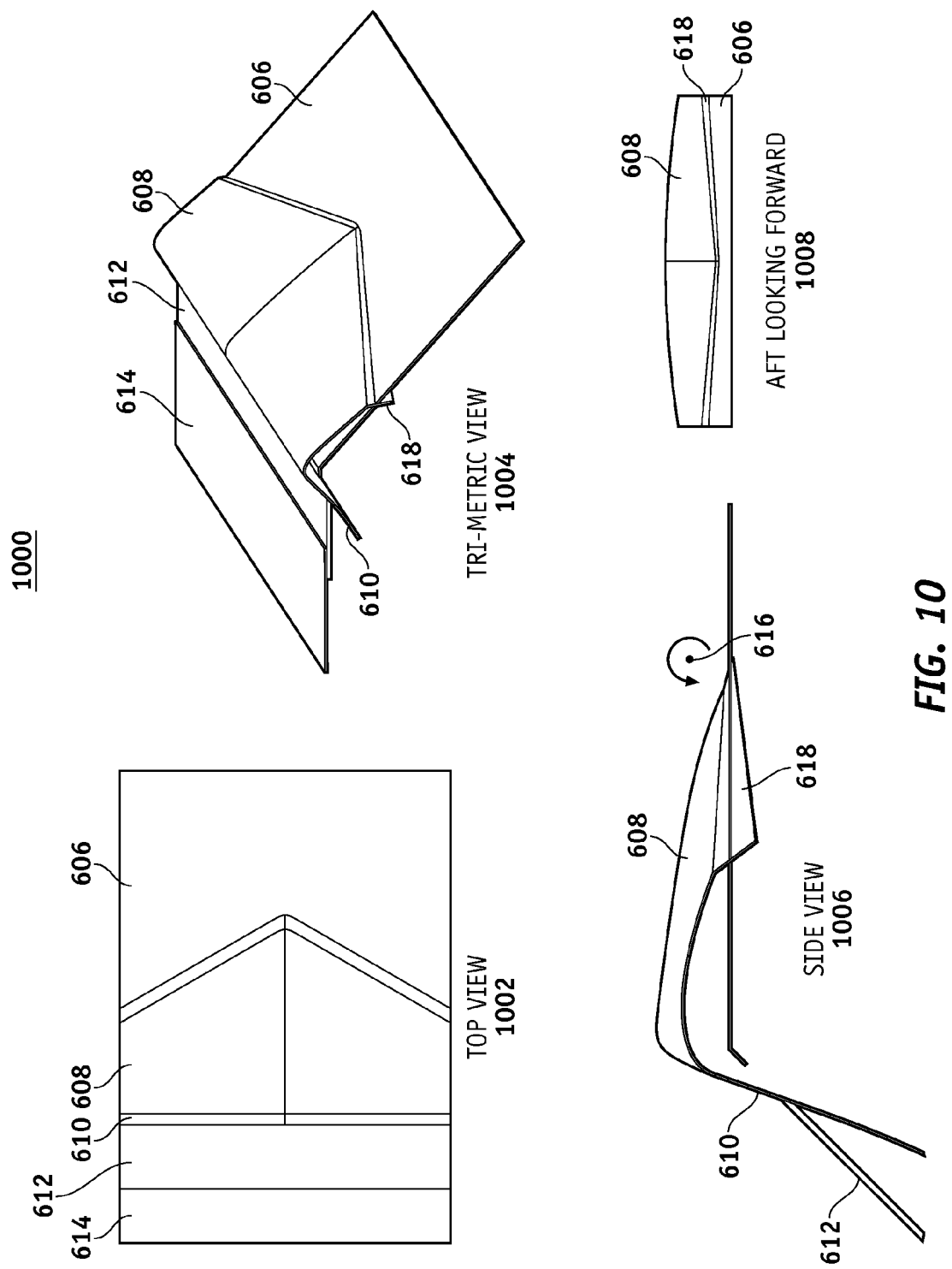
FIG. 10 is an illustration of a top view, a tri-metric view, a side view and an aft-looking-forward view of an exemplary nozzle throat control system at an intermediate throat area position according to an embodiment of the disclosure.

FIG. 10 is an illustration of a top view 1002, a tri-metric view 1004, a side view 1006 and an aft-looking-forward view 1008 of the exemplary nozzle throat control system 600 (FIG. 6) at an intermediate throat area position 1000 according to an embodiment of the disclosure.

Figure 11:
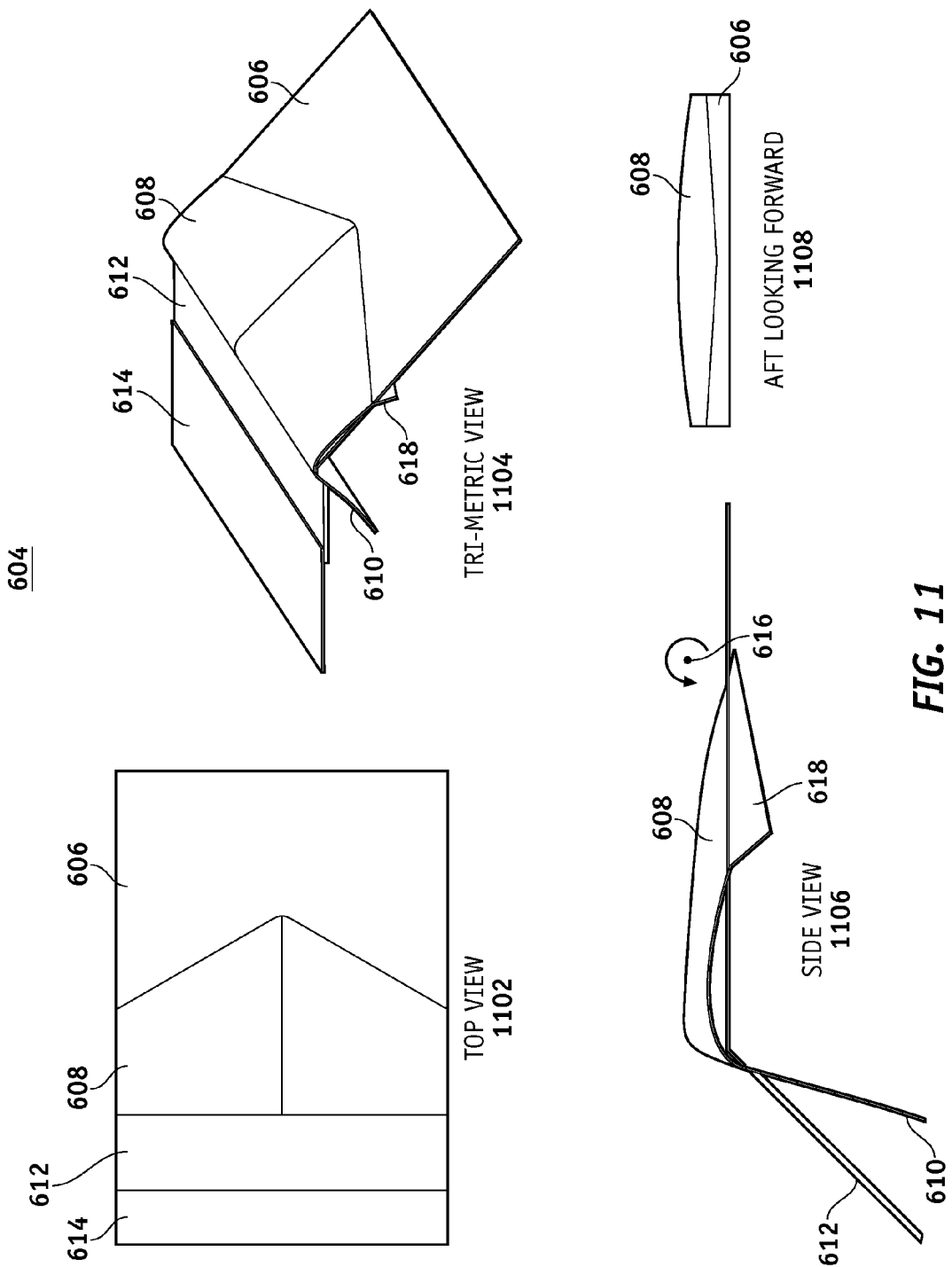
FIG. 11 is an illustration of a top view, a tri-metric view, a side view and an aft-looking-forward view of an exemplary nozzle throat control system at a maximum throat area position according to an embodiment of the disclosure.

FIG. 11 is an illustration of a top view 1102, a tri-metric view 1104, a side view 1106 and an aft-looking-forward view 1108 of the exemplary nozzle throat control system 600 at the maximum throat area position 604 (FIG. 6) according to an embodiment of the disclosure.

Figure 12:
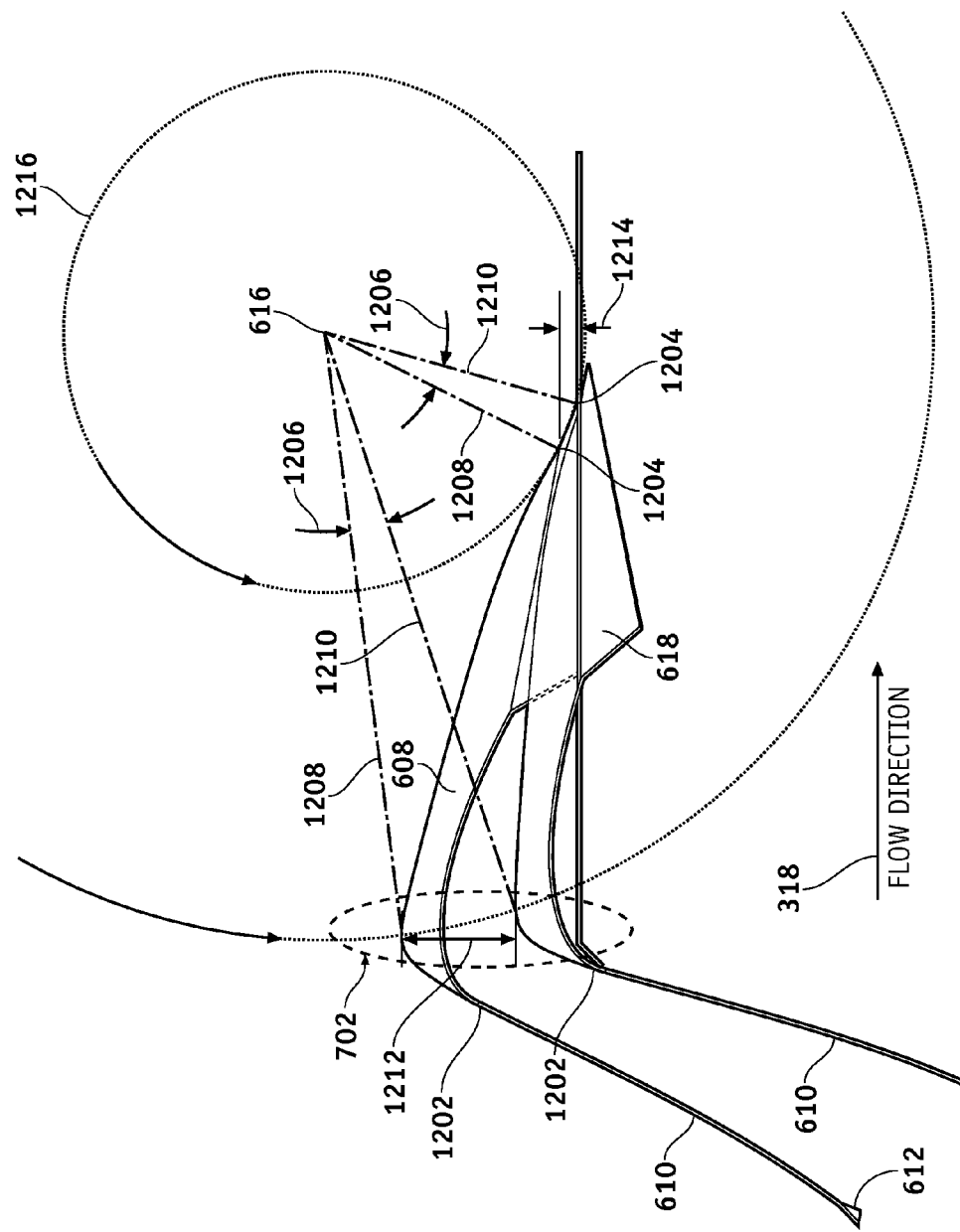
FIG. 12 is an illustration of motion of an exemplary nozzle throat control system rotating around an off-body axis-of-rotation without opening any gap according to an embodiment of the disclosure.

FIG. 12 is an illustration of motion of the exemplary nozzle throat control system 600 (mechanism 600) rotating around an off-body axis-of-rotation 616 without opening any gap such as the asymmetric gaps 420 and 518 shown in FIGS. 4 and 5 respectively according to an embodiment of the disclosure. The mechanism 600 rotates around the off-body axis-of-rotation 616 perpendicular to the flow direction 318. A distance between the off-body axis-of-rotation 616 and a forward point 1202 is greater than the distance between the off-body axis-of-rotation 616 and an aft point 1204. Therefore a same amount of rotation 1206 produces a greater travel 1212 at the forward point 1202 than a travel 1214 at the aft point 1204. An effect is the throat area 702 change at the forward point 1202. In one embodiment, for example but without limitation, the amount of rotation 1206 may be about 9 degrees to about 10 degrees, the forward point 1202 may be about 5 inches to about 6 inches, and the travel 1214 at the aft point 1204 may be about 0.7 inches to about 1 inches. A contour of the contoured interface surface 618 may be defined by a plurality of circles 1402 (FIG. 14) centered along the off-body axis-of-rotation 616, for example, similar to a circle 1216 in FIG. 12.

FIG. 13 is an illustration of a side view 1306, and a tri-metric view 1304 of an exemplary nozzle throat area utilizing the nozzle throat control system 600 showing various positions of the nozzle throat control system 600 during rotation around the off-body axis-of-rotation 616 without opening any gap according to an embodiment of the disclosure. In one embodiment, the gap in the convergent section 704 (FIG. 7) can be sealed with a simple translating surface such as the slide interface 612. The mechanism 600 passes through a constant gap 1302 in the angle notched nozzle surface 606 that is angled relative to the flow direction 318. The constant gap 1302 does not change in width during movement.

Figure 14:
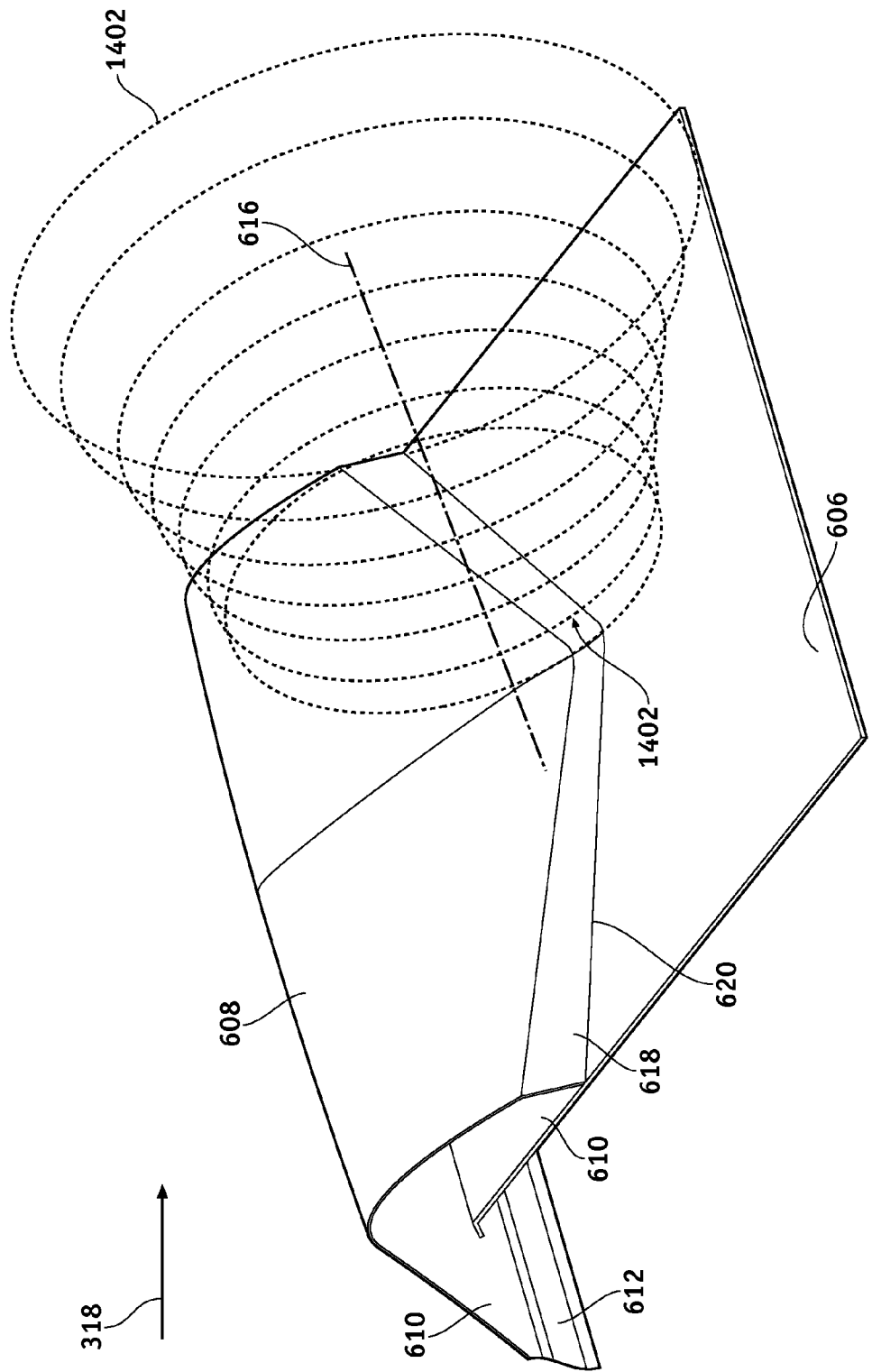
FIG. 14 is an illustration of an exemplary nozzle throat control system interface surface thereof according to an embodiment of the disclosure.

FIG. 14 is an illustration of the exemplary nozzle throat control system 600 showing the contoured interface surface 618 thereof according to an embodiment of the disclosure. The contoured interface surface 618 may be defined by the plurality of circles 1402 (e.g., a substantially infinite number of circles) centered along the off-body axis-of-rotation 616. The circle 1216 in FIG. 12 is an example of one of the circles 1402. Height of the contoured interface surface 618 is whatever is traced out by a rotation angle (e.g., about 9.5 degrees). Increasing or decreasing a radius of the circles 1402 allows the angular trailing edges 620 of the contoured interface surface 618 to be of any arbitrary shape. For example, the angular trailing edges 620 may be angled relative to the flow direction 318.

Figure 15:
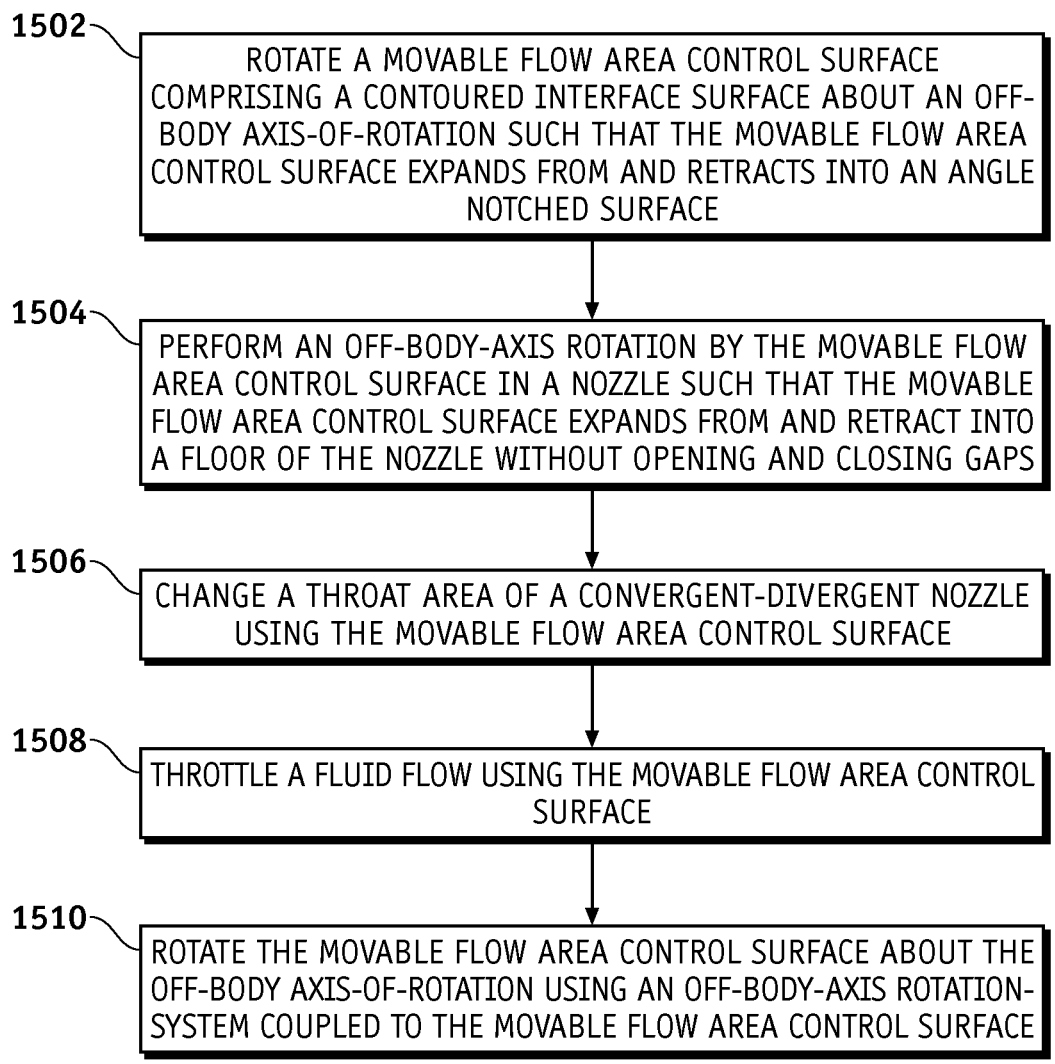
FIG. 15 is an illustration of an exemplary flowchart showing a process for controlling a nozzle throat area according to an embodiment of the disclosure.

FIG. 15 is an illustration of an exemplary flowchart showing a process 1500 for controlling a nozzle throat area according to an embodiment of the disclosure. The various tasks performed in connection with process 1500 may be performed mechanically, by software, hardware, firmware, computer-readable software, computer readable storage medium, or any combination thereof. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

For illustrative purposes, the following description of process 1500 may refer to elements mentioned above in connection with FIGS. 1-14. In practical embodiments, portions of the process 1500 may be performed by different elements of the system 600 and system 800 such as: the variable throat area mechanism 802, the actuator 804, the controller 808, the angle notched nozzle surface 606, the movable surface 608, the forward angle side 610, the slide interface 612, the forward flow panel 614, the off-body axis-of-rotation 616, the contoured interface surface 618, the angular trailing edges 620, the off-body-axis rotation-system 622 etc. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

Process 1500 may begin by rotating a movable flow area control surface such as the movable flow area control surface 608 comprising a contoured interface surface such as the contoured interface surface 618 about an off-body axis-of-rotation such as the off-body axis-of-rotation 616 such that the movable flow area control surface 608 expands from and retracts into an angle notched surface such as the angle notched surface 606 (task 1502).

Process 1500 may continue by performing an off-body-axis rotation by the movable flow area control surface 608 in a nozzle such as the convergent-divergent nozzle 700 such that the movable flow area control surface 608 expands from and retracts into a floor (e.g., the angle notched surface 606) of the nozzle without opening and closing a gap (task 1504). In this manner, gaps such as the asymmetric gaps 518 can be avoided. The floor of the nozzle may comprise, for example but without limitation, the angle notched surface 606, a side wall of a nozzle, or other surface of a nozzle.

Process 1500 may continue by changing a throat area such as the throat are 702 of the convergent-divergent nozzle 700 using the movable flow area control surface 608 (task 1506).

Process 1500 may continue by throttling a fluid flow using the movable flow area control surface 608 (task 1508).

Process 1500 may continue by rotating the movable flow area control surface 608 about the off-body axis-of-rotation 616 using an off-body-axis rotation-system such as the off-body-axis rotation-system 622 coupled to the movable flow area control surface 608 (task 1510).

Figure 16:
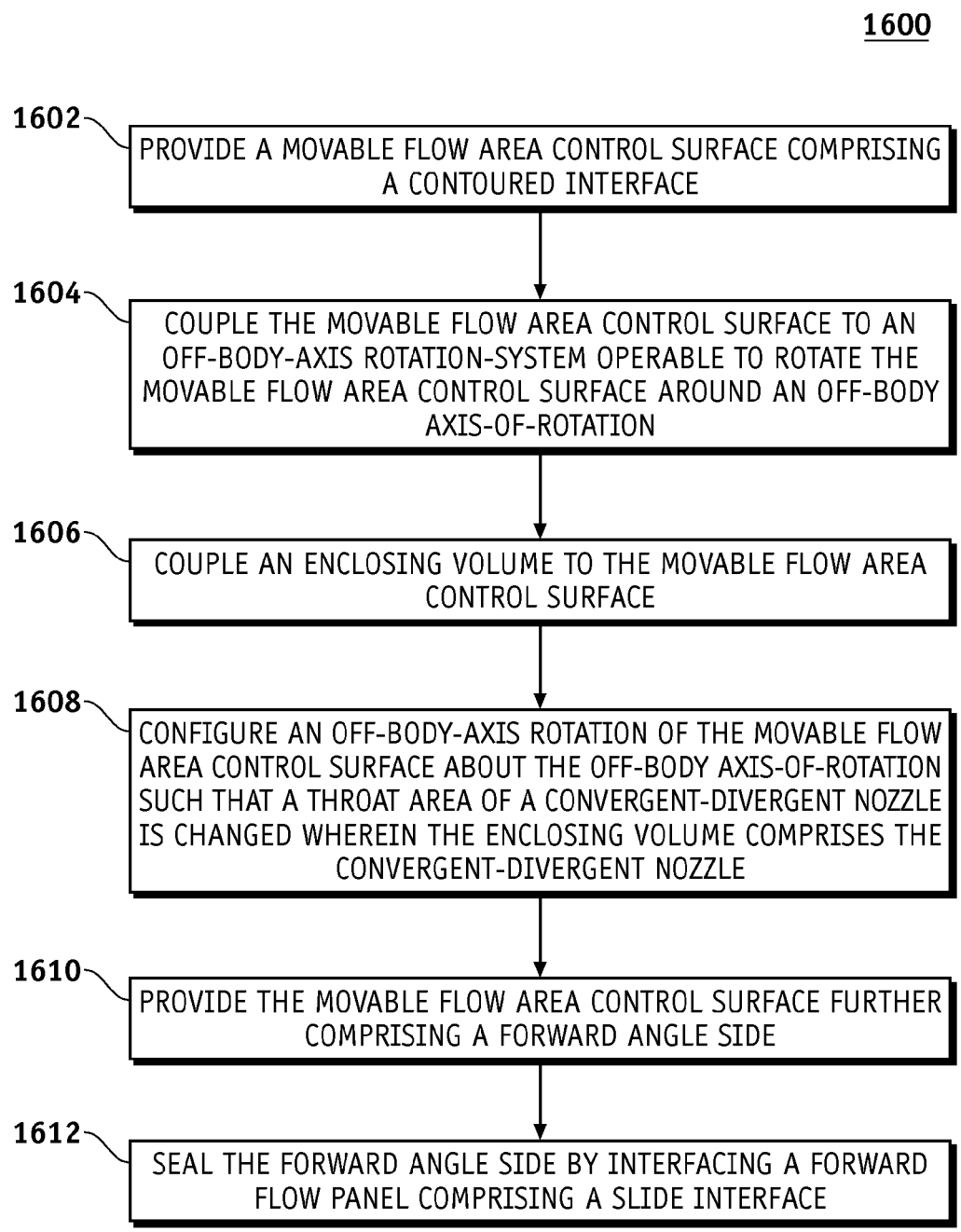
FIG. 16 is an illustration of an exemplary flowchart showing a process for providing a variable area mechanism according to an embodiment of the disclosure.

FIG. 16 is an illustration of an exemplary flowchart showing a process 1600 for providing a variable area mechanism according to an embodiment of the disclosure. The various tasks performed in connection with process 1600 may be performed mechanically, by software, hardware, firmware, computer-readable software, computer readable storage medium, or any combination thereof. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

For illustrative purposes, the following description of process 1600 may refer to elements mentioned above in connection with FIGS. 1-14. In practical embodiments, portions of the process 1600 may be performed by different elements of the system 600 and system 800 such as: the variable throat area mechanism 802, the actuator 804, the controller 808, the angle notched nozzle surface 606, the movable surface 608, the forward angle side 610, the slide interface 612, the forward flow panel 614, the off-body axis-of-rotation 616, the contoured interface surface 618, a the angular trailing edges 620, the off-body-axis rotation-system 622 etc. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

Process 1600 may begin by providing a movable flow area control surface such as the movable flow area control surface 608 comprising a contoured interface surface such as the contoured interface surface 618 (task 1602).

Process 1600 may continue by coupling the movable flow area control surface 608 to an off-body-axis rotation-system such as the an off-body-axis rotation-system 622 operable to rotate the movable flow area control surface 608 around an off-body axis-of-rotation such as the off-body axis-of-rotation 616 (task 1604).

Process 1600 may continue by coupling an enclosing volume to the movable flow area control surface 608 (task 1606). As mentioned above, for example but without limitation, the enclosing volume may comprise, the nozzle 700, a pipe, a pump, a hydraulic pump-jet, or other enclosing volume.

Process 1600 may continue by configuring an off-body-axis rotation of the movable flow area control surface 608 about the off-body axis-of-rotation 616 such that a throat area such as the throat area 702 of a convergent-divergent nozzle such as the convergent-divergent nozzle 700 is changed wherein the enclosing volume comprises the convergent-divergent nozzle 700 (task 1608).

Process 1600 may continue by providing the movable flow area control surface 608 further comprising a forward angle side such as the forward angle side 310 (task 1610).

Process 1600 may continue by sealing the forward angle side 310 by interfacing a forward flow panel such as the forward flow panel 614 comprising a slide interface such as the slide interface 612 (task 1612).

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 810 to cause the processor module 810 to perform specified operations. Such instructions, generally referred to as "computer program code" or "program code" (which may be grouped in the form of computer programs or other groupings), when executed, enable variable area mechanism with angular trailing edges methods of the system 800.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-14 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for varying a cross-sectional area of an enclosed volume, comprising:
   rotating a movable flow area control surface that has a contoured interface surface about an off-body axis-of-rotation in the enclosed volume such that the contoured interface surface of the movable flow area control surface expands from and retracts into a notch of an angle notched surface of a floor of the enclosed volume without opening and closing a gap between the angle notched surface and the movable flow area control surface, wherein the floor extends under the movable flow area control surface and wherein the angle notched surface of the floor comprises the notch that is angled to match the contoured interface surface to enable the contoured interface surface to be drawn into the floor, such that at a minimum throat area position the contoured interface surface is above floor level and at a maximum throat area position the contoured interface surface is drawn into the floor and below floor level to change flow area in the enclosed volume, wherein the movable flow area control surface has a forward angle side opposite the contoured interface surface and a forward flow panel with a slide interface;
   at the minimum throat area position, sealing the forward angle side of the movable flow area control surface with the slide interface overlapping the forward flow panel and a gap remains between the floor and the forward angle side; and
   at the maximum throat area position, sealing the forward angle side of the movable flow area control surface by interfacing the forward flow panel with the slide interface to extend the slide interface along the forward angle side causing the forward angle side to contact the floor and close the gap between the floor and the forward angle side.

2. The method of claim 1, further comprising changing a throat area of a convergent-divergent nozzle using the movable flow area control surface.

3. The method of claim 2, wherein a convergent section of the convergent-divergent nozzle receives airflow from an engine and a divergent section of the convergent-divergent nozzle receives airflow from the convergent section, and wherein the angle notched surface is provided in the divergent section.

4. The method of claim 2, wherein the forward angle side is provided in the convergent section.

5. The method of claim 1, further comprising throttling a fluid flow using the movable flow area control surface.

6. The method of claim 1, further comprising rotating the movable flow area control surface about the off-body axis-of-rotation using an off-body-axis rotation-system coupled to the movable flow area control surface.

7. A method for providing a variable area mechanism, comprising:
   providing a movable flow area control surface that has a contoured interface surface;
   coupling the movable flow area control surface to an off-body-axis rotation-system operable to rotate the movable flow area control surface around an off-body axis-of-rotation;
   rotating the movable flow area control surface around the off-body axis-of-rotation such that the contoured interface surface of the movable flow area control surface expands from and retracts into a notch of an angle notched surface of a floor of an enclosed volume without opening and closing a gap between the angle notched surface and the movable flow area control surface, wherein the floor extends under the movable flow area control surface and wherein the angle notched surface of the floor comprises the notch that is angled to match the contoured interface surface to enable the contoured interface surface to be drawn into the floor, such that at a minimum throat area position the contoured interface surface is above floor level and at a maximum throat area position the contoured interface surface is drawn into the floor and below floor level to change flow area in the enclosed volume, wherein the movable flow area control surface has a forward angle side opposite the contoured interface surface and a forward flow panel has a slide interface;

at the minimum throat area position, sealing the forward angle side of the movable flow area control surface with the slide interface overlapping the forward flow panel and a gap remains between the floor and the forward angle side; and at the maximum throat area position, sealing the forward angle side of the movable flow area control surface by interfacing the forward flow panel with the slide interface to extend the slide interface along the forward angle side causing the forward angle side to contact the floor and close the gap between the floor and the forward angle side.

* * * * *